May 17, 1955
G. D. ARNOLD
2,708,503
MATERIAL FEEDER
Filed July 1, 1949
2 Sheets-Sheet 1
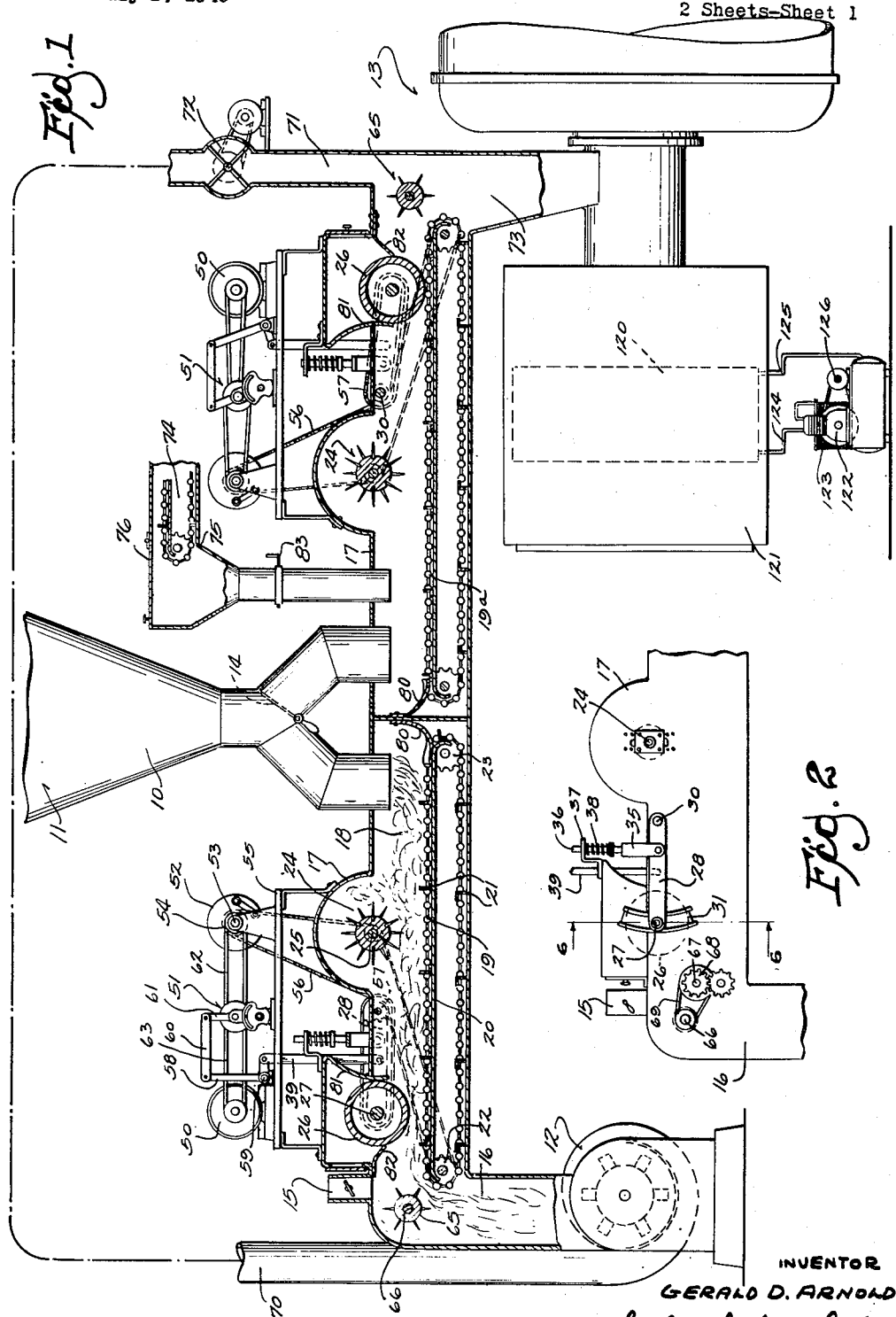
INVENTOR
GERALD D. ARNOLD
Wheeler, Wheeler & Wheeler
ATTORNEYS May 17, 1955
G. D. ARNOLD
2,708,503
MATERIAL FEEDER
Filed July 1, 1949
2 Sheets-Sheet 2
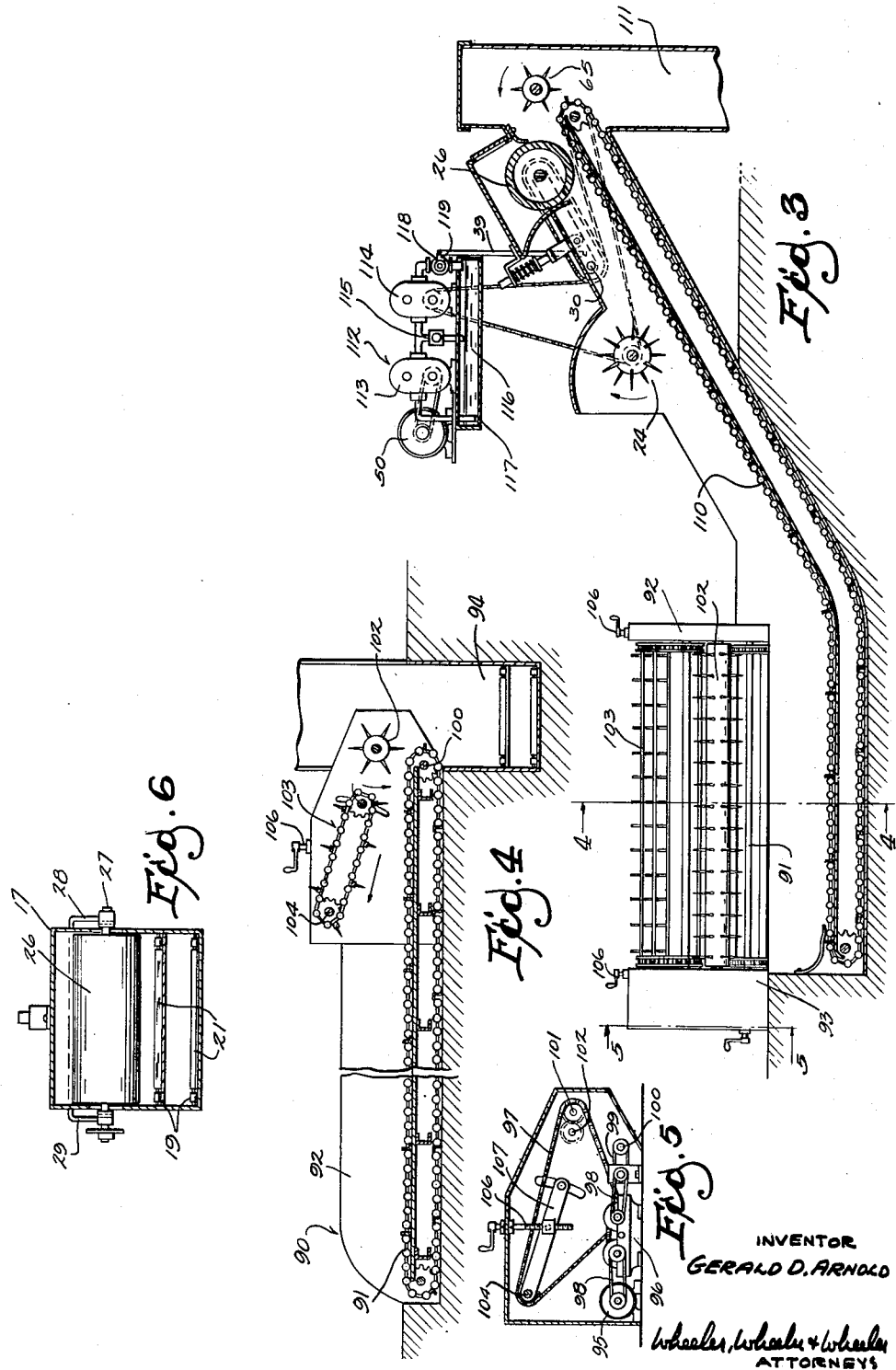
INVENTOR
GERALD D. ARNOLD
Wheeler, Wheeler + Wheeler
ATTORNEYS United States Patent Office 2,708,503
Patented May 17, 1955

2,708,503

MATERIAL FEEDER

Gerald D. Arnold, Wauwatosa, Wis.

Application July 1, 1949, Serial No. 102,580

5 Claims. (Cl. 198—37)

My invention relates to improvements in material feeders.

In modern material handling and treating processes the quality of the end product is dependent not only upon the characteristics of the type of process, but also upon the quantitative accuracy with which the material is fed through, or exposed for treatment. Despite the niceties of automatic control of heat, aeration, spray, or any other factors involved, any change in quantity of material offered to the treatment will influence the requirement for heat, or other factors. As to each factor, even with automatic control, there is some lag in response to changed requirement. It is to the provision of means for continuous, quantitatively uniform material feeding that my invention is directed.

The object of my invention is to provide variable speed material feeding equipment with improvements for maintaining a constant delivery of a predetermined quantity of fed material; to evenly spread progressing material, gauge the quantity of the spread material, and control the speed of the delivery mechanism accordingly; and to diffuse the material as it is delivered by the feeding mechanism so that any compacted portions of the material may be dispersed or comminuted.

Other objects of my invention include the provision of a combination of material feeding elements, each preparing and disposing the fed material for the succeeding elements, to the end that the finally delivered "pay load" is uniformly, accurately, gauged as to quantity, rate of delivery, and, even though pressure may be required at an intermediate step, qualitatively conditioned to its original free state, without compact lumps or chunks.

In the drawings:

Figure 1 is a longitudinal vertical section through a pair of my feeders, positioned to receive material from a common, central source of supply and to feed it to the right and left, respectively; the feeder on the left being shown in fully, heavily loaded condition and the feeder on the right being shown empty.

Figure 2 is a side elevation of a fraction of the left end of the feeder shown in Figure 1; portions of the interior mechanism being shown in dotted lines.

Figure 3 is a longitudinal vertical section of an inclined feeder equipped with my invention and showing an alternative form of speed reducer and controller.

Figure 4 is a section on line 4—4 of Figure 3, showing a quantitatively limited cross-feeder for reception of batches or loads of material for delivery to my accurately controlled feeder.

Figure 5 is a side elevation of the power, and speed reducer drive for the cross-feeder shown in Figure 4, a portion of the housing being shown in vertical section, Figure 6 is a section on line 6—6 of Figure 2.

Like parts are designated by the same reference characters throughout the several views.

In the following description and specification it will be understood that the material to be conveyed and delivered within the purview of my invention may be any form of fibrous, stringy, granular or agglomerated substance, but particular attention will be directed herein to the handling of such substances as hay, corn, freshly harvested grain or other produce, such as, in modern agricultural methods, is treated soon after the harvest, either thermally, mechanically, or chemically in processes requiring accuracy. In most instances this involves predetermination or control of quantity of raw material to be handled. These substances tend to agglomerate. They are, in the mass, quite spongy or springy. They are, before treatment, irregular in physical dimensions and difficult to gauge as to both weight and quantity, due to varying interstitial spaces in the agglomerated, raw supply.

My invention is incorporated in a portion of the equipment for advancing raw material through the steps in a feeding mechanism and in a preliminary way it will be noted that in the drawings the major structural components are; a hopper or other input receptacle; a conveyor, preferably of the slatted drag type, over which the quantity of fed material is gauged; variable speed transmission means to control the conveyor, a raking device to level the fed material prior to the gauging operation; a gauge roller at the delivery end of the conveyor with operative connections between the gauge and the variable speed transmission; dispersing breaker, or fluffing means to act on the gauged product, and output means to complete the delivery of the gauged product. Throughout the path of material travel it will be noted that I have controlled or sealed my feeder against air leakage so that the material is delivered through a duct without appreciable accompanying surplus air movement.

The following description will trace a particular raw material from the delivery hopper, 10 of a pneumatic separator 11 through my feeder, alternatively to the left and ultimately to a hammer mill 12, or to the right and ultimately to a refrigerant or cooling treatment chamber 13. Schematically I have indicated at 14, in dotted lines, a gate to direct the raw material to the left or right, and at 15 a dampered air supply, since many of my feeders are used where little vagrant air admission is permissible and there is need for my special construction and arrangement of this conveyor on the left of Fig. 1, which enables me to seal the delivery throat 16 pneumatically in an effective manner in housing 17, as will be described below.

Assuming that the raw material delivered to the left through the gate 14 is a substance such as freshly cut alfalfa 18, it will be deposited in clumps and fragments on slatted, drag type conveyor 19 of a well known type of construction. There the pay load is received on a "floor" 20, whereupon it is dragged to the left by slats 21 forming part of the chain belt of the conveyor propelled and directed by sprocketed shafts 22 and 23. Thus the alfalfa is positively supported for a levelling and gauging operation, now to be described.

Because of agglomeration and the widely variant thickness of the mat of material deposited on the floor 20 and on the conveyor, I provide a "rake" or levelling device 24 comprising any form of combing surface supported on a shaft 25 extending over the pay load surface. The rake is rotated on shaft 24 in a direction to throw back excess or thickly deposited pay load toward the input end of the conveyor, with the result that the pay load passing beyond the rake is substantially levelled and evenly disposed over the floor 20. Height of the rake above the floor 20 is adjustable as indicated in Fig. 2.

Directly over the supporting sprocket 22 of the conveyor 20, or as near to the delivery end of the conveyor as it is practicable to place it I provide a gauge roller or other heavy gauge plate 26 to "ride" upon the surface of the pay load. Since a fairly substantial weight bearing on the alfalfa, or other pay load is desirable, I find it practical to make this gauge 26 in the form of a roller which is power driven at approximately the rate of travel of the pay load on the conveyer, or, in some instances, at a slightly more rapid surface speed than that of the pay load. As shown in the drawings, the shaft 27 for the roller 26 is mounted upon and extends between arms 28 and 29 (see Figs. 2 and 6). These arms are disposed respectively on either side of housing 17, with respect to which each is pivotally secured on shaft 30. This provides for swinging movement of the arms 28 and 29, and of the roller shaft 27, and for "free" riding of the gauge roller 26 on the material advanced by the conveyor. Arcuate slots in the side wall of housing 17 have side margins formed as grooves for closure plates 31 that move with shaft 27 and maintain a seal to prevent air leakage into the housing.

A yoke 35 extending between arms 28 and 29, over the housing 17, is provided with an upstanding spring guide rod 36 guided through spring abutment 37. A loading spring 38 between the yoke and the abutment places added load upon the gauge roller to assure that the alfalfa or other material is compressed sufficiently to give an accurate indication, by the height of the roller position, of the quantity of alfalfa moving under the roller. Such compression also reduces the interstitial spaces and limits the amount of air which may pass under the gauge roller or plate.

Extending from one of the arms 28 or 29 is a speed control rod 39 providing part of the connecting linkage to a speed changer and power device for operating the conveyer and levelling rake.

Any form of power source, such as the electric motor shown at 50 may be located in a suitable position to drive some type of variable speed transmission which I have shown schematically at 51. A clutch pulley 52 on clutch shaft 53 with suitable pulleys and sprockets at 54 on the shaft 53 complete the speed control and power mechanism, which may be mounted on a platform 55.

A chain 56, shown partly in dotted lines in Figures 1 and 3, extends over or around a sprocket on shaft 53, a sprocket on shaft 25 to drive the rake 24, around a sprocket on shaft 23 to drive the conveyer 19, and around a sprocket 57 on shaft 30 to form part of the driving connection for gauge roller 26. Thus one chain can provide power connections to all of these moving parts of my feeder as well as to certain other parts to be described below.

Reference above has been made to speed control rod 39 which is moved in a somewhat reciprocatory motion as gauge roller 26 rises and falls in accord with increased or decreased thickness of the ribbon of compressed material passing beneath it. A bell crank 58, the axis 59 of which is secured to the platform 55, connects rod 39 with a link 60 to translate motion of rod 39 to the adjusting lever 61 of speed control 51. The result, therefore, of a change in level of the gauge roller 26 is to change speed of rotation of shaft 53 to which the speed changer is power connected by belt 62; speed changer 51 being power connected to motor 50 by means of belt 63.

Many of the materials to be fed by the conveyer 19 and gauged by the roller 26 will be compacted by the weight of the roller and the delivered material will be so dense and solid as to retard or interfere with subsequent treatment or processing operations. Therefore, as another of the elements in combination with a conveyer, rake, and gauge roller, I provide a spiked breaker 65 shown in Figures 1 and 3 opposite the end of the conveyer 20. In Figure 2 I have shown the drive connections between the shaft 22 of the conveyer and a shaft 66 with which the breaker 65 rotates. These connections include an idler shaft 67 and its gear 68, with a suitable belt or chain 69 extending to the breaker shaft whereby to drive the breaker at sufficient speed to tear or break apart material leaving the conveyer. This will normally call for a breaker peripheral speed somewhat greater than the surface speed of the material moving with, or from the conveyer.

The "pay load" having been evenly raked, pressed and accurately gauged as to thickness on the conveyer, and the speed of the conveyer having been speeded faster for a "thin" load—slower for a thick or heavy load, it is clear that the output from the conveyer is quantitatively steady. Therefore the operation of a processing or material handling device such as the hammermill at 12 will be much more satisfactory and effective. Here no overload to slow down or clog the mill 12, and no wasteful idle time thereof will interfere with steady flow of payload through a delivery duct 70 ultimately extending to a common delivery chute 71 after the material has been cleared through a separator and choke feeder at 72.

Referring now to the feeder shown at the right in Figure 1, it will be seen that the parts are practically duplicates of the parts theretofore described with respect to the controlled feed of material to the left in Figure 1; but here the conveyer is free of material and the gauge roller is in its lowermost position, with the variable speed transmission adjusted to its greatest output speed. The conveyer is therefore travelling at its maximum speed, with the object of delivering as much material as possible to the common delivery duct 73.

When it is undesirable to deliver material to my uniform conveyer through pneumatic separator 10, I provide a special delivery duct and hopper, shown schematically at 83, into which material may be fed by a conveyer 74 housed at 75, with a hinged hood 76 for hand feed or for inspection. Thus two kinds of material may be fed simultaneously to the common duct 73 with assurance that their quantitative proportions will remain substantially constant under control of my speed changers and uniform feeders.

My conveyer gauge roller and other elements of the combination of my invention are provided with aprons or air seals 80, 81 and 82 so that only a controlled amount of air may be bled into the system at 15. A damper 83 in the funnel duct may be used to shut off air bleed when batches are not being fed and it will be understood that the air seals 80, 81 and 82 are sufficiently resilient to follow the adjustments and operational movements of the parts.

In Figures 3 and 4 I have shown my invention incorporated in an inclined elevator type conveyer, and I further show my batch handling feeder for assuring complete levelling or evening of my feeder delivery, despite serious overload conditions due to heavy batch loads. In Figure 4 the batch conveyer 90 has a slat type drag conveyer belt 91 with suitable side walls 92 and 93 at either side to receive large amounts, as for instance truck loads of raw material. Any form of suitable power drive propels the conveyer 91 so that the raw material is caused to progress toward a pit 94 at the delivery end of the batch conveyer. In Figure 5 I have shown such a power drive unit, including an electric motor 95, a variable speed transmission 96, and suitable belts or chains (97—98—99) to provide power connection to conveyer sprocket shaft 100 and to shaft 101 for driving connections to breaker 102 comparable to breaker 65 in Figure 1.

Above the delivery end of my batch conveyer 91 and in position to rake the payload back toward the "front" end of the conveyer I provide a short, conveyer type rake 103 moving over suitable rollers or sprockets on shafts 104 and 105. Therefore, despite large batch loads of raw material delivered onto conveyer 91, the rake 103 will limit the depth of material passing to the breaker 102 and into the pit 94, as shown most clearly in Figure 4.

I provide handled adjusting screws 106 for rake conveyer arms 107 at either side of the conveyer 103, and since the lower end of the rake conveyer 103 has its shaft 105 mounted in the ends of these arms it is possible for the operator to adjust the height of the lower end of the rake conveyer to predetermine the thickness of the ribbon of material delivered to the pit 94. Chain 97 passes over a sprocket on shaft 104 to drive the rake 103.

Moving in the pit and to an elevated point out of the pit I provide conveyer 110 to receive raw material from batch conveyer 91. It will be obvious from the description in this specification that the conveyer 110 may supply raw material to conveyer 74 in Figure 1, or it may carry the raw material upwardly to a relatively high point for delivery into an outlet duct 111, as shown in Figure 3.

Other than the provision of a particular type of hydraulic variable speed transmission device at 112 my constant feed invention is evidenced by comparable mechanism at the right in Figure 3 or at the right and left in Figure 1. I have therefore designated the parts thereof by the same reference characters.

The variable speed transmission at 112 in Fig. 3 includes pump 113 driven by motor 50. The output, hydraulically, from this pump is directed either to a hydraulic motor 114 or through a by-pass valve 115 to a sump 116. The sump tank forms the base 117 for the variable speed mechanism. By-pass valve 115 is a well-known "loaded" valve which is designed to open at a predetermined pressure. Thus the constant speed of the motor 50 is available to maintain constant hydraulic pressure for the motor, even though the motor is stopped, or slowed down much of the time. The hydraulic motor 114 provides power for the chain drive such as 56 for the conveyer 110 and my combined parts for my invention, and the speed of the motor can be controlled by a throttle valve 118 at the outlet side of the motor 114. In this instance control rod 39 is connected to throttle valve adjusting arm 119 and, as the gauge roller 26 rises and lowers, the valve 118 is moved toward closed or open position respectively. Thus the conveyer 110 is slowed when the load is heavier and speeded when the load is lighter.

From the above description it will be seen that my provision of levelling means, such as rake or comb 24 or 103, of gauge roll or plate 26, of variable speed power connections for the material conveyer, and of a breaker to correct any caking or compression due to the weight or pressure of the gauge roll, provides for a successful, steady feed of conveyed material.

All of the elements of my equipment are adapted to modern material handling requirements, provision being made for sealing the conveyer housing against leakage of air where excess untreated air may be injurious to the product or process. This may be of special importance where material is to be treated in a refrigerated, or cooling process illustrated schematically in Figure 1 where I have shown a heat exchanger and evaporator 120 in a housing 121. The heat exchanger is cooled by conventional refrigeration mechanism such as the compressor 122, condenser 123 and appropriate connections 124—125, with a motor 126 to power the compressor.

Obviously there must be some control of air admitted to the treatment chamber 13 if the process is to be efficient, and the air admitted with the pay load through the common duct 73 must be held to a minimum if the cooled air through 120 is to be adequate. (Thus the aprons at 80, 81 and 82 are important, and are located so that incoming air with the raw material is controlled.) Here too, the pressure of the gauge roller 26 is of great assistance where springy, fibrous material is being handled—only a minimum quantity of air being permitted to pass over the roller or through the compacted material beneath the roller.

Even if my invention illustrated at the right in Fig. 1 is operating on a wet product fed by my feeder to be treated or dried, it is likewise important that vagrant air be excluded by my weighted roller 26 and apron 81.

This conveyer is a complete self contained feeder, fully automatic and self controlled, which delivers a substantially uniform volume of material continuously in a diffused form. It is driven by a primary drive that is manually set to deliver the maximum amount of material the device being fed will process efficiently.

I claim:

1. A feeder having a variable speed feeder power device with material moving mechanism connected thereto to move material toward a delivery end thereof, a spreader for evenly disposing material with respect to the material moving mechanism, a weighted gauge rider disposed to bear upon the material whereby to uniformly compact said material, and connections between the gauge rider and the variable speed power device to change the speed of the mechanism in response to change in position of the gauge rider, said gauge rider comprising a cylinder roller, and driving connections to said cylinder to rotate it in the direction of feeder movement.

2. A material moving apparatus including a supporting surface over which the material is moved, means for advancing the material over said surface at controllable speeds, a power driven levelling device coacting with the material in a direction opposed to its movement whereby to dispose the material in a bed of even thickness over said surface, a pressure roller having a floating mounting and resilient means biasing the roller to bear upon the levelled material whereby to compact said material to a uniform density, and a connection between the roller and the means for advancing the material, whereby to slow the speed thereof as the roller is moved away from the supporting surface by added thickness of moving material and to increase the speed thereof as the roller moves toward the surface, said roller being provided with means rotating it in the direction of feeder movement.

3. An automatic feeder conveyor for continuous quantitatively steady delivery of material received by the feeder in batch quantities, said feeder including a levelling rake moving in opposition and in spaced relation to the conveyor; a gauge plate for pressure application to the material on the conveyor to uniformly compact the levelized material and provided with power control connections; and variable speed power means for the conveyor connected to said power connections for variation of speed of delivery by the conveyor in response to change in depth of material thereon, said gauge plate comprising a cylinder roller, the roller and conveyer having a single source of rotative power connected thereto.

4. A material feeder comprising a power driven conveyor having a speed control, means for depositing on the conveyor batches of material to be fed, subsequent means for leveling said material on the conveyor and comprising a rotary spreader power driven in a direction opposite to the direction of conveyor movement, a pressure roller having a floating mounting upon which the roller is movable to and from the conveyor, said roller being biased toward the conveyor whereby to uniformly compact the leveled material, control connections between said pressure roller and the conveyor speed control whereby conveyor speed is regulated according to the position of the pressure roller, and a breaker to break the compacted material as it is discharged from said conveyor, said compacting roller being provided with driving means whereby to drive said roller in the direction of material feed and at substantially the same rate.

5. The device of claim 4 wherein said conveyor is provided with an air tight housing, said roller mount having substantially tight slidable bearings in said housing, to constitute a floating partition to exclude material gas movement into or out of the housing, said housing being provided with an apron extending therefrom into slidable line contact with said roller.

References Cited in the file of this patent

UNITED STATES PATENTS

| | | |
|---|---|---|
| 532,623 | Wright | Jan. 15, 1895 |
| 586,778 | Marlow | July 20, 1897 |
| 710,574 | Grossmann | Oct. 7, 1902 |
| 972,465 | Mueller | Oct. 11, 1910 |
| 1,177,049 | Peterson | Mar. 28, 1916 |
| 1,259,828 | Bronder | Mar. 19, 1918 |
| 1,899,260 | Clements | Feb. 28, 1933 |
| 1,922,883 | Crago | Aug. 15, 1933 |
| 1,996,700 | Fulmer | Apr. 2, 1935 |
| 2,124,219 | Wheeler | July 19, 1938 |
| 2,162,443 | Muller | June 13, 1939 |
| 2,308,508 | Harrington | Jan. 19, 1943 |
| 2,367,775 | Hohman | Jan. 23, 1945 |

FOREIGN PATENTS

| | | |
|---|---|---|
| 533,766 | Germany | Sept. 18, 1931 |